United States Patent
Fertig et al.

(10) Patent No.: US 7,930,485 B2
(45) Date of Patent: Apr. 19, 2011

(54) SPECULATIVE MEMORY PREFETCH

(75) Inventors: Michael K Fertig, Sunnyvale, CA (US);
Patrick Conway, Los Altos, CA (US);
Kevin Michael Lepak, Austin, TX (US);
Cissy Xumin Yuan, Sunnyvale, CA (US)

(73) Assignee: Globalfoundries Inc., Grand Cayman (KY)

( * ) Notice: Subject to any disclaimer, the term of this patent is extended or adjusted under 35 U.S.C. 154(b) by 830 days.

(21) Appl. No.: 11/780,283

(22) Filed: Jul. 19, 2007

(65) Prior Publication Data

US 2009/0024835 A1 Jan. 22, 2009

(51) Int. Cl.
*G06F 13/00* (2006.01)
(52) U.S. Cl. .......... 711/137; 712/207
(58) Field of Classification Search .......... 711/137; 712/207
See application file for complete search history.

(56) References Cited

U.S. PATENT DOCUMENTS

| | | | |
|---|---|---|---|
| 5,778,436 A * | 7/1998 | Kedem et al. | 711/137 |
| 6,282,614 B1 * | 8/2001 | Musoll | 711/122 |
| 6,401,193 B1 * | 6/2002 | Afsar et al. | 712/207 |
| 6,457,101 B1 | 9/2002 | Bauman et al. | |
| 6,865,652 B1 | 3/2005 | Pencis et al. | |
| 7,003,633 B2 | 2/2006 | Glasco | |
| 7,103,725 B2 | 9/2006 | Glasco | |
| 7,107,408 B2 | 9/2006 | Glasco | |
| 7,434,004 B1 * | 10/2008 | Spracklen et al. | 711/137 |
| 7,487,296 B1 * | 2/2009 | Iacobovici et al. | 711/137 |

OTHER PUBLICATIONS

U.S. Appl. No. 11/877,311, filed Oct. 23, 2007.

* cited by examiner

*Primary Examiner* — Hetul Patel
(74) *Attorney, Agent, or Firm* — Rory D. Rankin; Meyertons, Hood, Kivlin, Kowert & Goetzel, P.C.

(57) ABSTRACT

A system and method for pre-fetching data from system memory. A multi-core processor accesses a cache hit predictor concurrently with sending a memory request to a cache subsystem. The predictor has two tables. The first table is indexed by a portion of a memory address and provides a hit prediction based on a first counter value. The second table is indexed by a core number and provides a hit prediction based on a second counter value. If neither table predicts a hit, a pre-fetch request is sent to memory. In response to detecting said hit prediction is incorrect, the pre-fetch is cancelled.

20 Claims, 6 Drawing Sheets

SPECULATIVE MEMORY PREFETCH

BACKGROUND OF THE INVENTION

1. Field of the Invention

This invention relates to microprocessors, and more particularly, to finding an efficient method to achieve speculative pre-fetching of data from system memory.

2. Description of Related Art

In modern microprocessors, one or more processor cores, or processors, may be included in the microprocessor, wherein each processor is capable of executing instructions of a software application. Modern processors are typically pipelined wherein the processors are comprised of one or more data processing stages connected in series with storage elements placed between the stages. The output of one stage is made the input of the next stage during each transition of a clock signal. Ideally, every clock cycle produces useful execution of an instruction for each stage of the pipeline. In the event of a stall, which may be caused by a branch misprediction, i-cache miss or d-cache miss, data dependency, or other reason, no useful work may be performed for that particular instruction during the clock cycle. For example, a d-cache miss may require several clock cycles to service and, thus, decrease the performance of the system as no useful work is being performed during those clock cycles. The overall performance hit may be reduced by overlapping the d-cache miss service with out-of-order execution of multiple instructions per clock cycle. However, a stall of several clock cycles still reduces the performance of the processor due to in-order retirement that may prevent complete overlap of the stall cycles with useful work.

Further, system memory may comprise two or three levels of cache hierarchy for a processor core or for multiple cores on a microprocessor. Later levels in the hierarchy of the system memory may include access via a memory controller to dynamic random-access memory (DRAM), dual in-line memory modules (dimms), and a hard disk. Access to these lower levels of memory require a significant number of clock cycles. The multiple levels of caches that may be shared among multiple cores on a microprocessor help to alleviate this latency when there is a cache hit. However, as cache sizes increase and later levels of the cache hierarchy are placed farther away from the processor core, the latency to determine if a requested memory line exists in a cache also increases. This latency becomes more problematic for processor cores that access each level of cache in a serial manner. Should a processor core have a memory request followed by a serial access of each level of cache where there is no hit, followed by a DRAM access, the overall latency to service the memory request may become a substantial penalty.

One solution for reducing the access time for a memory request is to use a speculative request to the cache hierarchy and to DRAM. However, each access to DRAM may inadvertently close a DRAM page to other processor cores. If the requested memory line is in one of the caches, then the access to DRAM, and inadvertent closing of a DRAM page, was unnecessary. Also, the memory controller and data bus are used for unnecessary accesses. If the cache hit rate is high, resources external to the processor core and needed by other processor cores, may be made not available by the unnecessary requests sent to DRAM.

To remove unnecessary requests to DRAM and subsequent unnecessary resource consumption, a cancellation scheme may be employed that uses the hit status of all the caches. However, the hit status of all the caches may not be known until the speculative request has already been sent to DRAM. Alternatively, the speculative request may be delayed, but then the benefit is reduced or removed altogether.

In view of the above, an efficient method for achieving speculative pre-fetching of data from system memory is desired.

SUMMARY OF THE INVENTION

Systems and methods for achieving efficient speculative pre-fetching of data from system memory are contemplated. In one embodiment, a method is provided to issue memory requests to a cache subsystem that may have multiple levels. A memory line may be part of a memory block or page that has corresponding information such as a memory address and status information stored by the method. Also a corresponding 2-level predictor may be used by the method to predict whether or not a memory line corresponding to the memory request is stored in the cache subsystem. The predictor may be implemented by a pair of counters. The first counter may track the short-term toggling between a hit and a miss of a memory block and may be indexed by a portion of the memory address. A second counter may track the long-term trend of whether or not the memory block is stored in the bottom level of the cache subsystem and may be indexed by a core number for a multi-core processor.

The predictor may be accessed at the same time a memory request accesses the cache subsystem. If the predictor predicts a cache miss for the memory block corresponding to the memory request, a pre-fetch memory request may be sent to memory. If the predictor is correct, when the processor sends a request to memory, the data may already be residing in the memory controller or may shortly arrive in the memory controller due to the earlier pre-fetch request. Therefore, the latency to access the required data from the memory hierarchy may be greatly reduced. Also, if the predictor predicts a miss, but there is a hit in any of the levels of the cache subsystem, the pre-fetch request may be canceled. Since the pre-fetch request is sent only when a miss is predicted, system resources such as the system bus and memory, such as a bank of DRAM, may not be unnecessarily accessed in order to reduce data latency for a memory request.

In another aspect of the invention, a computer system is provided comprising a processor, a cache subsystem, and a memory. The processor may be a multi-core processor and be configured to receive instructions for memory access operations such as load and store instructions. The processor may issue a memory access request to the cache subsystem in order to retrieve required data for the load or store instruction. The processor may comprise a cache hit predictor and simultaneously access this predictor while it accesses the cache subsystem. The predictor may comprise two tables. The first table may contain entries that store status information, a portion of a memory address, a saturating counter. The table may be indexed by the memory address portion. In one embodiment, a miss in the table refers to a predicted miss of the memory request in the bottom level of the cache subsystem. A hit in the table along with a corresponding counter value that meets or exceeds a threshold value corresponds to a predicted hit in the bottom level of the cache subsystem.

The second table may contain entries that store status information, a core number, and a saturating counter. The second table may be indexed by the core number. A miss in the table refers to a predicted miss of the memory request in the bottom level of the cache subsystem. A hit in the table along with a corresponding counter value that meets or exceeds a threshold value corresponds to a predicted hit in the bottom level of the cache subsystem. If either of the first or second table predict a hit, selector circuitry predicts a hit in the bottom level of the cache subsystem. If the predictor provides a cache miss prediction for a memory request, a pre-fetch request may be sent to memory. As above, if the predictor is correct, when the processor sends a request to memory, the data may already be residing in the memory controller or may shortly arrive in the memory controller due to the earlier pre-fetch request. Therefore, the latency to access the required data from the memory hierarchy may be reduced. Also, if the predictor predicts a miss, but there is a hit in any of the levels of the cache subsystem, the pre-fetch request may be canceled. Since the pre-fetch request is sent only when a miss is predicted, system resources such as the system bus and memory, such as a bank of DRAM, may not be unnecessarily accessed in order to reduce data latency for a memory request.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
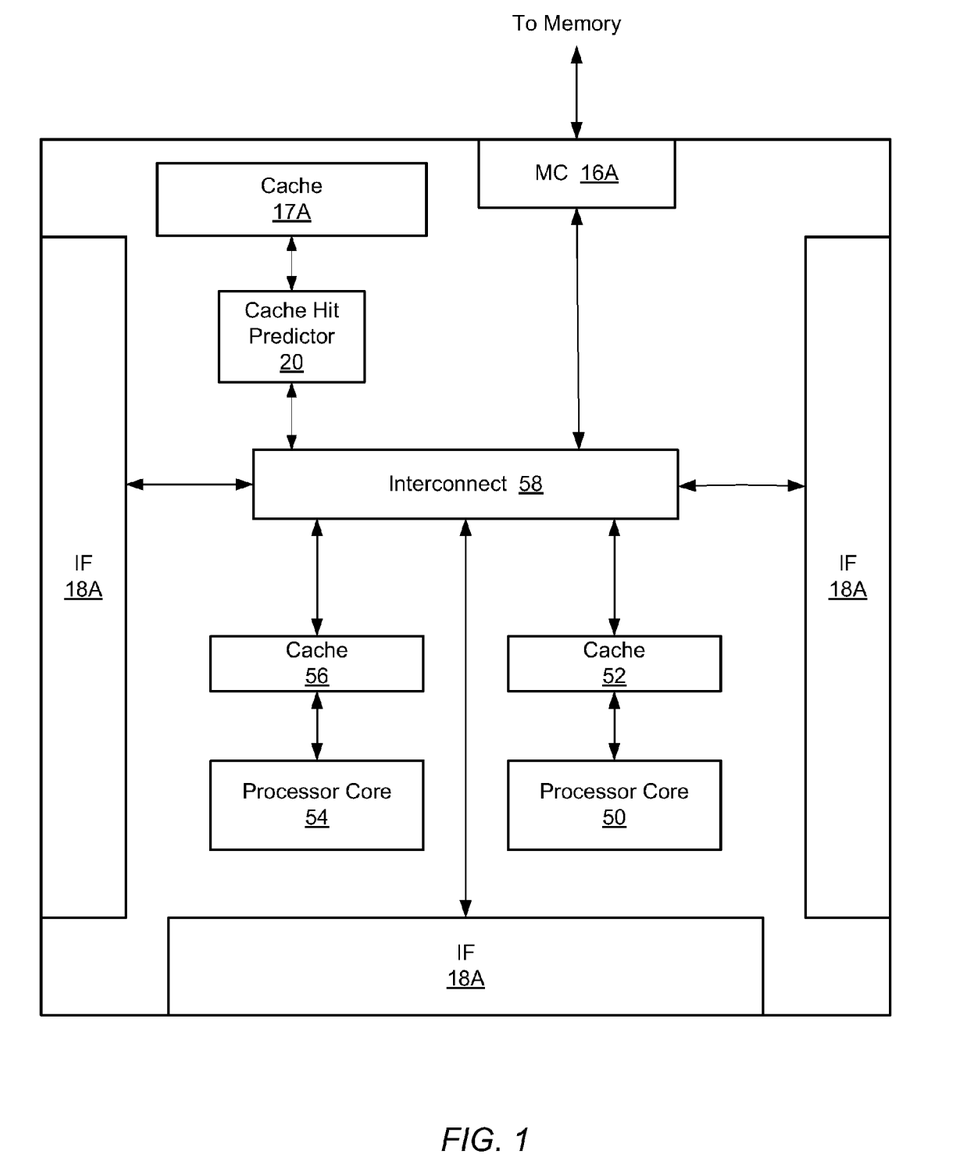
FIG. 1 is a generalized block diagram illustrating one embodiment of a computer system.

FIG. 1 is a block diagram of one embodiment of a chip multi-processing node 12A. Processing node 12A includes memory controller 16A, interface logic 18A, a processor core 50, a cache memory subsystem 52 and interconnect 58, and cache memory subsystem 17A. Processing node 12A may also include one or more additional processor cores 54 and cache memory subsystems 56, as desired. In one embodiment, the illustrated functionality of processing node 12A is incorporated upon a single integrated circuit. Also shown in FIG. 1 is a cache 17A which may be shared by the multiple cores (50, 54), and a cache hit predictor 20.

Generally speaking, interconnect 58 is configured to respond to control packets received on the links to which processing node 12A is coupled, to generate control packets in response to processor cores 50 and 54 and/or cache memory subsystems 52, 56, and 17A, and predictor 20, to generate probe commands and response packets in response to transactions selected by memory controller 16A for service, and to route packets for which node 12A is an intermediate node to other nodes through interface logic 18A. Interface logic 18A may include logic to receive packets and synchronize the packets to an internal clock used by packet processing logic 58.

Cache subsystems 17A, 52 and 56 comprise high speed cache memories configured to store blocks of data. Cache memory subsystems 52 and 56 may be integrated within respective processor cores 50 and 54. Alternatively, cache memory subsystems 52 and 56 may be coupled to processor cores 52 and 56 in a backside cache configuration or an in-line configuration, as desired. Still further, cache memory subsystems 52 and 56 may be implemented as a hierarchy of caches. Caches which are nearer processor cores 50 and 54 (within the hierarchy) may be integrated into processor cores 50 and 54, if desired. In one embodiment, cache memory subsystems 52 and 56 each represent level two (L2) cache structures and cache memory subsystem 17A represents a level three (L3) cache structure. In one embodiment, cache 17A may comprise a victim cache.

Processor cores 50 and 54 generally include circuitry for executing instructions according to a predefined instruction set. For example, the x86 instruction set architecture may be selected. However, any other instruction set architecture may be selected. Generally, the processor cores 50 and 54 access the cache memory subsystems 52 and 56, respectively, for data and instructions. If a cache miss is detected in a cache (52, 56) and is also detected in the L3 cache 17A, a read request is generated and transmitted to the memory controller within the node to which the missing block is mapped. It is noted that the embodiment depicted in FIG. 1 is provided for purposes of discussion. Those skilled in the art will appreciate that the methods and mechanisms described herein are applicable to numerous alternative embodiments and configurations. For example, embodiments with more than two cores, or even a single core, are possible. All such alternatives are contemplated.

In one embodiment, as will be discussed in further detail below, cache hit predictor 20 is configured to detect accesses to cache 17A and predict whether or not the access will hit in the cache. If the predictor 20 predicts the access will miss in the cache 17A, a prefetch request for the data being accessed is generated and conveyed to memory via memory controller 16A. If the memory access does in fact miss in the cache 17A, then a request to retrieve the data from memory is generated and conveyed to the memory controller 16A. However, due to the previously generated prefetch request, the requested data may already be in the memory controller (or soon to be received) and latency for retrieval of the data may be reduced. If the predictor 20 predicts a miss and a prefetch requests is generated, and the memory access hits in the cache 17A, then a suitable command/signal is conveyed to cancel the prefetch request. If the memory controller 16A has already received the prefetched data, the data may simply be discarded.

On the other hand, if the predictor 20 predicts a hit in the cache 17A, then no such prefetch request is generated. If it turns out that the memory access hits in the cache 17A, then the data is returned as per the established protocol. However, if the memory access misses in the cache 17A, then a request to retrieve the data from memory is generated and conveyed to the memory controller 16A. As the predictor 20 predicted a hit and not prefetch request was generated, the data is retrieved from memory. Further details regarding the prefetching of data will be discussed below.

Figure 2A:
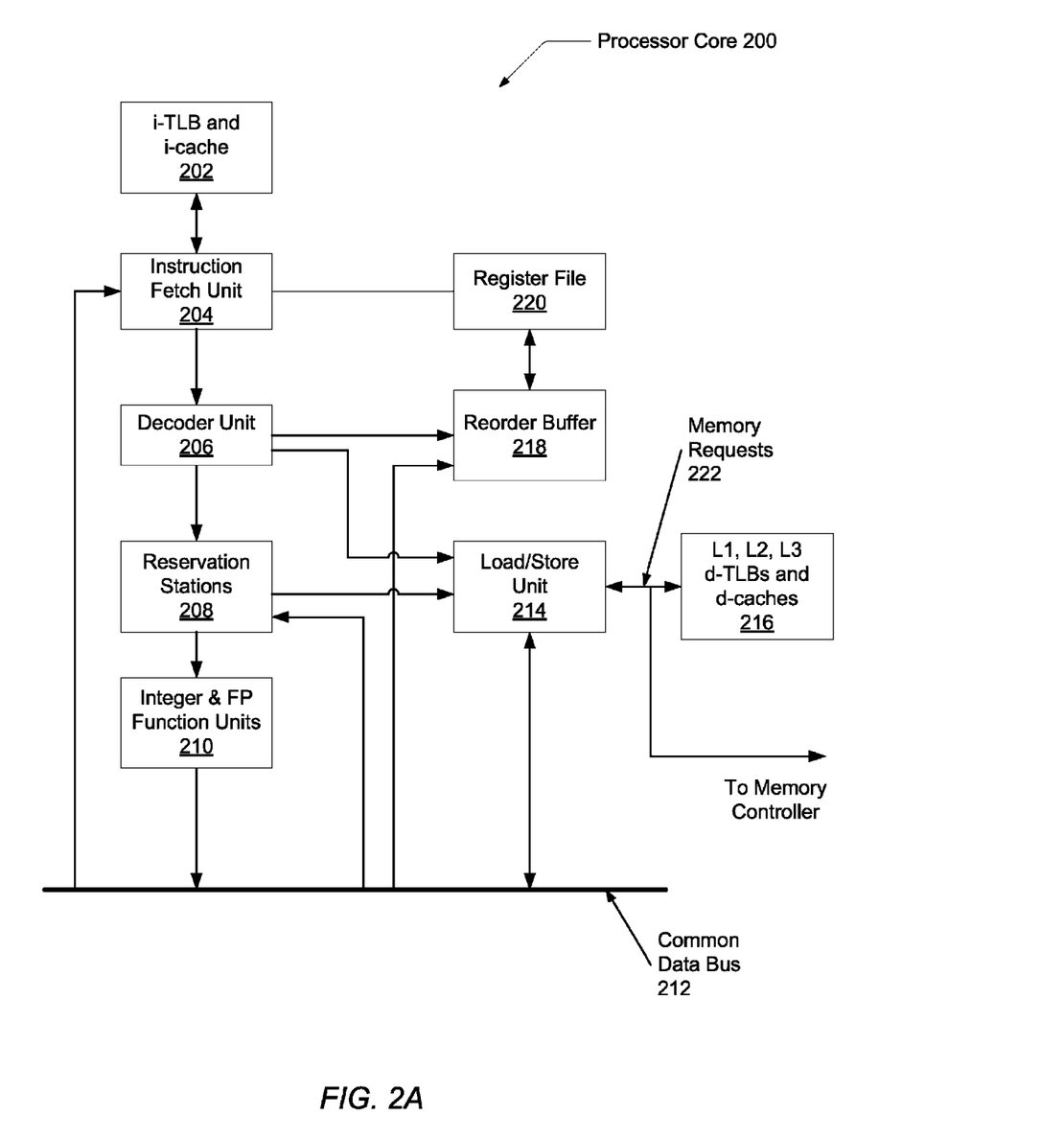
FIG. 2A is a generalized block diagram illustrating one embodiment of an out-of-order executing processor.

FIG. 2A illustrates one embodiment of a processor core 200 that performs out-of-order execution. An instruction-cache (i-cache) and corresponding translation-lookaside-buffer (TLB) 202 may store instructions for a software application and addresses in order to access the instructions. The instruction fetch unit (IFU) 204 may fetch multiple instructions from the i-cache 202 per clock cycle if there are no i-cache misses. The IFU 104 may include a program counter that holds a pointer to an address of the next instructions to fetch in the i-cache 102, which may be compared to addresses in the i-TLB. The IFU 104 may also include a branch prediction unit to predict an outcome of a conditional instruction prior to an execution unit determining the actual outcome in a later pipeline stage.

The decoder unit 206 decodes the opcodes of the multiple fetched instructions and may allocate entries in an in-order retirement queue, such as reorder buffer 218, in reservation stations 208, and in a load/store unit 214. The allocation of entries in the reservation stations 208 is considered dispatch. The reservation stations 208 may act as an instruction queue where instructions wait until their operands become available. When operands are available and hardware resources are also available, an instruction may be issued out-of-order from the reservation stations 208 to the integer and floating point functional units 210 or to the load/store unit 214. Memory accesses such as load and store operations are issued to the load/store unit 214. The functional units 210 may include arithmetic logic units (ALU's) for computational calculations such as addition, subtraction, multiplication, division, and square root. Logic may be included to determine an outcome of a conditional instruction. The load/store unit 214 may include queues and logic to execute a memory access instruction. Also, verification logic may reside in the load/store unit 214 to ensure a load instruction receives forwarded data from the correct youngest store instruction.

The load/store unit 214 may send memory access requests 222 to the one or more levels of data cache (d-cache) 216 on the chip. Each level of cache may have its own TLB for address comparisons with the memory requests 222. Each level of cache 216 may be searched in a serial or parallel manner. If the requested memory line is not found in the caches 216, then a memory request 222 is sent to the memory controller in order to access the memory line in system memory off-chip. The serial or parallel searches, the possible request to the memory controller, and the wait for the requested memory line to arrive may require a substantial number of clock cycles.

Results from the functional units 210 and the load/store unit 214 may be presented on a common data bus 212. The results may be sent to the reorder buffer 218. In one embodiment, the reorder buffer 218 may be a first-in first-out (FIFO) queue that ensures in-order retirement of instructions according to program order. Here, an instruction that receives its results is marked for retirement. If the instruction is head-of-the-queue, it may have its results sent to the register file 220. The register file 220 may hold the architectural state of the general-purpose registers of processor core 200. Then the instruction in the reorder buffer may be retired in-order and its head-of-queue pointer may be adjusted to the subsequent instruction in program order.

The results on the common data bus 212 may be sent to the reservation stations 208 in order to forward values to operands of instructions waiting for the results. For example, an arithmetic instruction may have operands that depend on the results of a previous arithmetic instruction, or a load instruction may need an address calculated by an address generation unit (AGU) in the functional units 210. When these waiting instructions have values for their operands and hardware resources are available to execute the instructions, they may be issued out-of-order from the reservation stations 208 to the appropriate resources in the functional units 210 or the load/store unit 214. Uncommitted, or non-retired, memory access instructions have entries in the load/store unit. The forwarded data value for an in-flight, or uncommitted, load instruction from the youngest uncommitted older store instruction may be placed on the common data bus 112 or simply routed to the appropriate entry in a load buffer within the load/store unit 214.

Figure 2B:
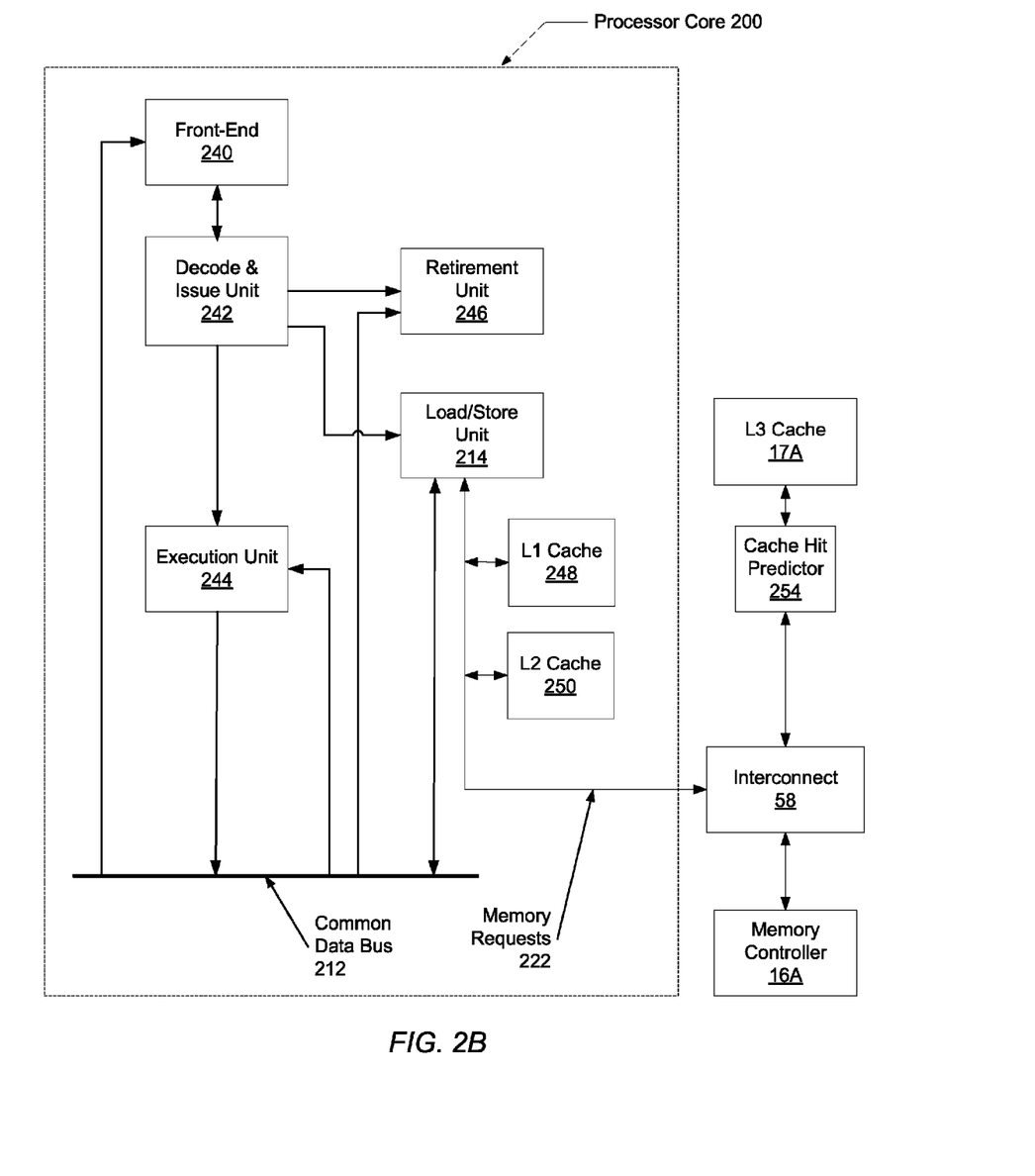
FIG. 2B is a generalized block diagram illustrating another embodiment of an out-of-order executing processor with a cache hit predictor.

FIG. 2B depicts a generalized block diagram of a processor core 200 coupled to a cache hit predictor 254, level three (L3) cache 17A, and memory controller 16A via interconnect 58. Front-end 240 may comprise an instruction-cache (i-cache), its corresponding TLB, and an IFU to fetch multiple instructions from the i-cache per clock cycle if there are no i-cache misses. Decode and Issue Unit 242 may comprise a decoder unit to decode the opcodes of instructions and reservation stations to issue instructions for subsequent execution. Execution Unit 244 may comprise integer and floating point functional units for arithmetic operations. A common data bus 222 may be included to broadcast results of operations in order to forward data for operands of pending operations or to retire the operation. Retirement Unit 246 may comprise a reorder buffer to ensure in-order retirement of operations being executed out-of-order and a register file to store the architectural state of the processor as applications execute.

A load/store unit 214 may store information of uncommitted load and store operations and send memory requests 222 to the different levels of caches and/or to the memory controller in order to access DRAM. In one embodiment, the different levels of caches may include three levels such as a L1 cache 248, a L2 cache 250, and a L3 cache 252. Each cache may have its own corresponding translation lookaside buffer (TLB). Each cache may increase in size the farther it is away from the load/store unit 214. For example, the L2 cache may be larger than the L1 cache, and the L3 cache may be larger than the L2 cache. Additionally, the access time of a cache may increase as the size of the cache increases. Therefore, accessing the L2 cache 250 may take longer than accessing the L1 cache 248.

When the load/store unit 214 has a memory access operation to execute, it may send a memory request 222 to the L1 cache 248. If there is a hit, or the requested memory line is found in the L1 cache 248, then the memory line is sent to the load/store unit 214. However, if there is a miss, or the requested memory line is not found in the L1 cache 248, then the load/store unit 214 may access the L2 cache 250. If there is a miss here, then the load/store unit 214 may access the L3 cache 17A. Finally, if there is a miss in the L3 cache 17A, then the load/store unit 214 may send a memory request 222 to the memory controller. The memory controller will access system memory in order to find the memory line, store the data value when it arrives from system memory, and send it to the load/store unit.

Each of the above steps may require many clock cycles to perform and the latency to retrieve the requested memory line may be relatively large. The retrieved data from system memory via the memory controller 16A may arrive at an earlier clock cycle if a speculative pre-fetch request is sent to the memory controller. However, it may be inefficient to send such a request for every memory line request since the memory controller may access resources needed by other processors such as a network bus and a page in a bank of DRAM. If a cache hit may be predicted with a desired degree of certainty, then no pre-fetch request may be sent to the memory controller. However, if a cache miss may be predicted with a desired degree of certainty, then a pre-fetch request may be sent to the memory controller in parallel with the already existing memory requests to the caches (e.g., the L3 cache 17A). If the access misses in the L3 cache 17A, then the logic may send a request to the memory controller. Now, the requested memory line may arrive sooner or already be stored in the memory controller due to the earlier pre-fetch request.

In one embodiment, a cache hit predictor 254 may be coupled to the bottom level cache 17A. In other embodiments, the cache hit predictor 254 may be located elsewhere than shown. In one embodiment, the cache hit predictor 254 is shared among two or more cores of a multi-core processor. The cache hit predictor 254 may be accessed during a memory request. In one embodiment, an address of the requested memory line may be sent to the predictor 254 as well as a processor core number. The predictor 254 may provide a prediction of whether or not the requested memory line resides in the bottom level cache. In this example, the predictor 254 may provide a prediction of an L3 cache 17A hit.

Figure 3A:
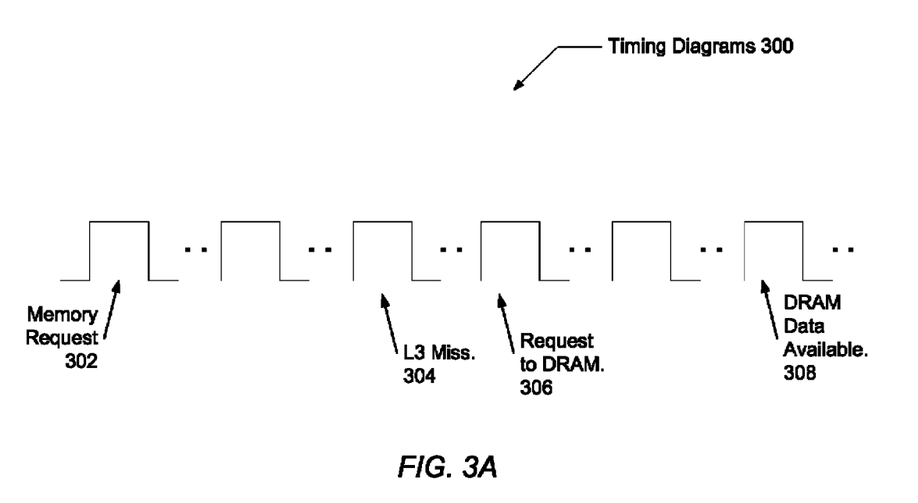
FIG. 3A is a generalized block diagram illustrating one embodiment of a timing diagram of a memory access.

Turning now to FIG. 3A, a timing diagram of multiple clock cycles is shown. A memory request 302 may be sent from a processor core via a load/store unit to a L1 d-TLB and d-cache. If the requested memory line is not in the caches and the processor core is connected to three levels of caches, then several clock cycles later, the processor core may receive an L3 miss control signal 304. The processor core in a later clock cycle may send out a request to system memory 306, such as DRAM, via a memory controller. Several clock cycles later, the requested memory line may be received by the memory controller and sent to the processor core 308.

Figure 3B:
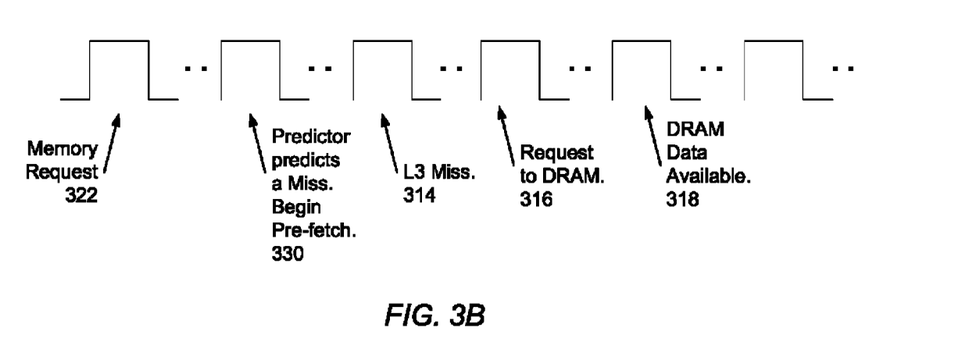
FIG. 3B is a generalized block diagram illustrating another embodiment of a memory access with a cache hit predictor.

FIG. 3B illustrates a similar timing diagram as above for a memory request of a processor core. Again, a memory request 322 may be sent from the processor core via a load/store unit to a L1 d-TLB and d-cache. However, a predictor may relay a prediction of a miss in the caches 330 in a later clock cycle. The processor core may send a pre-fetch request to the memory controller in the same or later clock cycle based on the miss prediction. If all the levels of caches do not include the requested memory line, then the processor core may be notified of an L3 miss 314. As above, the processor core may send a memory request to DRAM 316 via the memory controller in the same or a later clock cycle. However, now due to the previous pre-fetch request, the requested memory line may already be stored in the memory controller 318 or arrive a smaller number of clock cycles later than if no pre-fetch request was sent. A successful prediction of a cache miss in the bottom level of the caches may allow an earlier speculative request to the memory controller to provide the requested memory line in an earlier clock cycle than if no speculative request was used.

Figure 4:
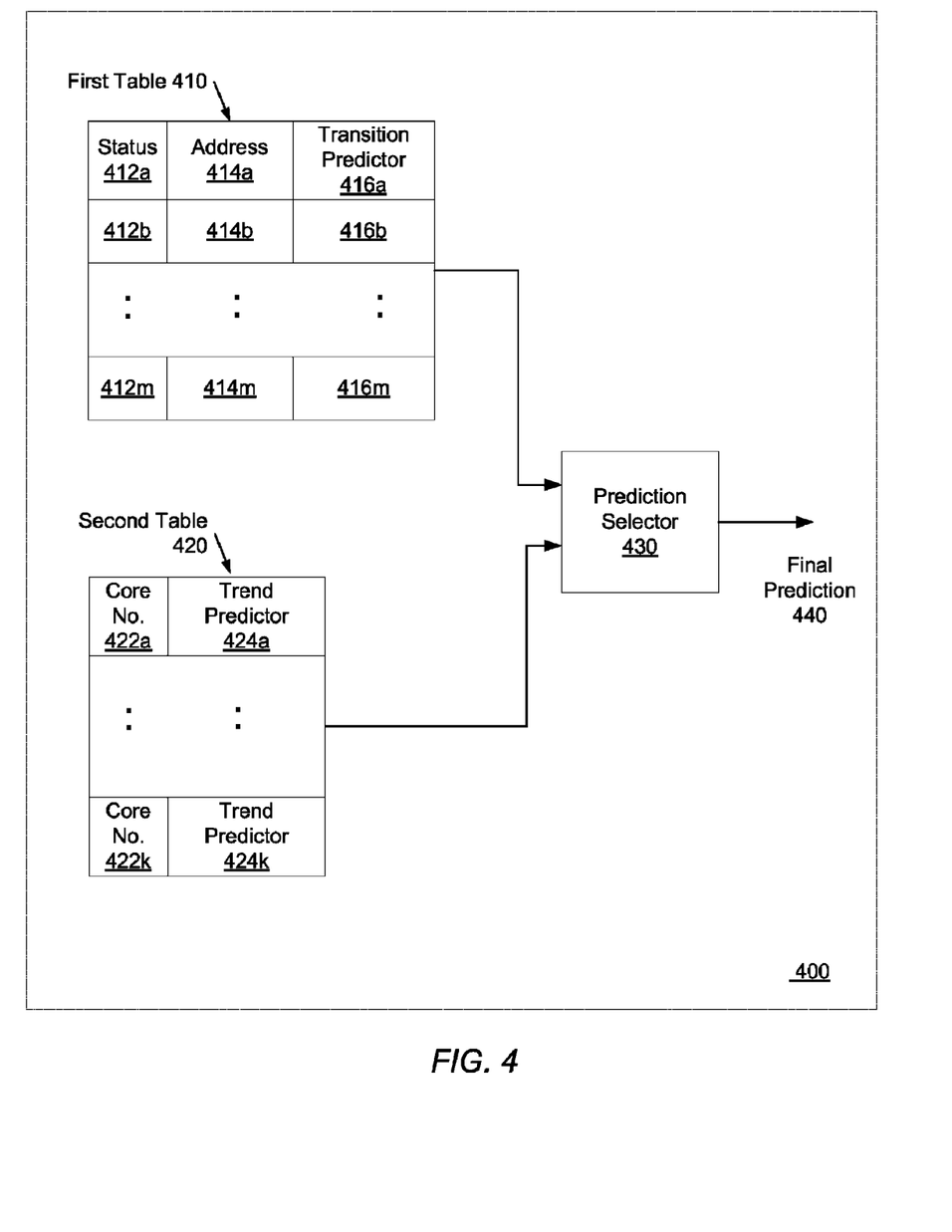
FIG. 4 is a block diagram of a cache hit predictor.

Referring to FIG. 4, one embodiment of a cache hit predictor 400 is shown. The predictor may comprise two predictors with each predictor in a separate table. First table 410 may comprise entries with a status field 412, an address field 414, and a transition predictor field 416. In one embodiment, first table 410 may not need many entries to provide sufficient accuracy. For example, in one embodiment, first table 410 may only need 8 entries. The status field 412 may include at least a valid bit that specifies the entry contains a valid address and a prediction to possibly use. In one embodiment, the granularity of the memory to predict that may reside in the bottom level of the caches, such as a L3 d-cache, may be a 4 KB page. In this case, the address field 414 may include the portion of the machine addresses above the 11$^{th}$ bit. For example, a processor may use an address field 414 in first table 410 that holds only bits [31:12] of the memory request addresses that hit in the L3 d-cache.

A transition predictor may be used to monitor recent toggling between a hit and a miss of a memory line, or page in other embodiments, rather than a long-term trend. In one embodiment, a transition predictor may comprise a saturating 2-bit counter where the most-significant bit is used to predict a hit (logic value of 1) or a miss (logic value of 0). Thus, a hit corresponds to when the saturating counter meets or exceeds a threshold value. The counter may be incremented during a hit in the bottom level cache and decremented during a miss in the bottom level cache.

In one embodiment, a new entry may be allocated in First Table 410 when a hit occurs in the bottom level cache. In such an embodiment, an entry that misses in the bottom level cache and is subsequently placed in the bottom level cache according to the processor's replacement strategy is not placed in First Table 410 at this time. This particular entry may not be placed in First Table 410 until a subsequent hit of that entry in the bottom level cache.

When a new entry is to be allocated in First Table 410, entries that are currently marked invalid in the status field 412 may be chosen first to be replaced. In one embodiment, when an address of a memory request is not found by an associative search of first table 410, then a miss is predicted by first table 410. If there are no invalid entries, then entries that are currently predicting a strong miss, such as a value of 0 in a 2-bit counter implementation of the transition predictor 416, may be replaced. These entries may not offer new information since an unallocated entry also denotes a strong miss. If there are no strong miss entries, then the entries may be replaced in a round-robin manner. In one embodiment, a newly allocated entry may have its transition predictor field 416 set to a strong hit, such as a value of 3 for a 2-bit counter implementation.

In one embodiment, Second Table 420 may comprise a core no. 422 field and a trend predictor field 424. Core no. field 422 may store the value of a number denoting a core of a processor. For example, a microprocessor with 2 processor cores may have indexes such as 0 and 1 stored in second table 420 in core no. field 422. The trend predictor 424 may be used to monitor a long-term trend of hits and misses in the bottom level cache versus short-term toggling which is monitored by the transition predictor 416. In one embodiment, the trend predictor 424 may be implemented by a saturating 6-bit counter. The counter may be incremented during a hit in the bottom level cache and decremented during a miss in the bottom level cache. When the value stored in trend predictor 424 reaches or pasts a threshold value, then trend predictor 424 predicts a hit in the bottom level cache. For example, in one embodiment, a threshold value may be set at 80% of the maximum value that can be held by a counter in the trend predictor field 424. Should a 6-bit counter be used, then a threshold value may be set at 56.

In one embodiment, when a processor core switches to a new thread or process, the tables 410 and 420 may not be flushed. Both tables may be small and may be trained quickly for a new thread or process. Thus, implementation of the predictors may be simplified without the need for more control logic.

A prediction selector 430 may be used to select between a short-term transition prediction and a long-term trend prediction. In one embodiment, prediction selector 430 may be implemented by a logic OR gate. If either table 410 or 420 provide a hit prediction, then final prediction 440 may send out a hit prediction signal. In another embodiment, selector 430 may include circuitry to receive accessed information from both table 410 and 420 and determine whether or not each table provides a cache hit prediction. A pre-fetch request to the memory controller may not be sent, since the required memory line is predicted to be in the bottom level cache. If neither table 410 or 420 predict a hit, then final prediction 440 may send out a miss prediction signal. A pre-fetch request may be sent to the memory controller, since the required memory line is predicted to not be in the bottom level cache. If the miss prediction is correct, then the required memory line may be retrieved at an earlier time than if the cache hit predictor 400 was not used.

Figure 5:
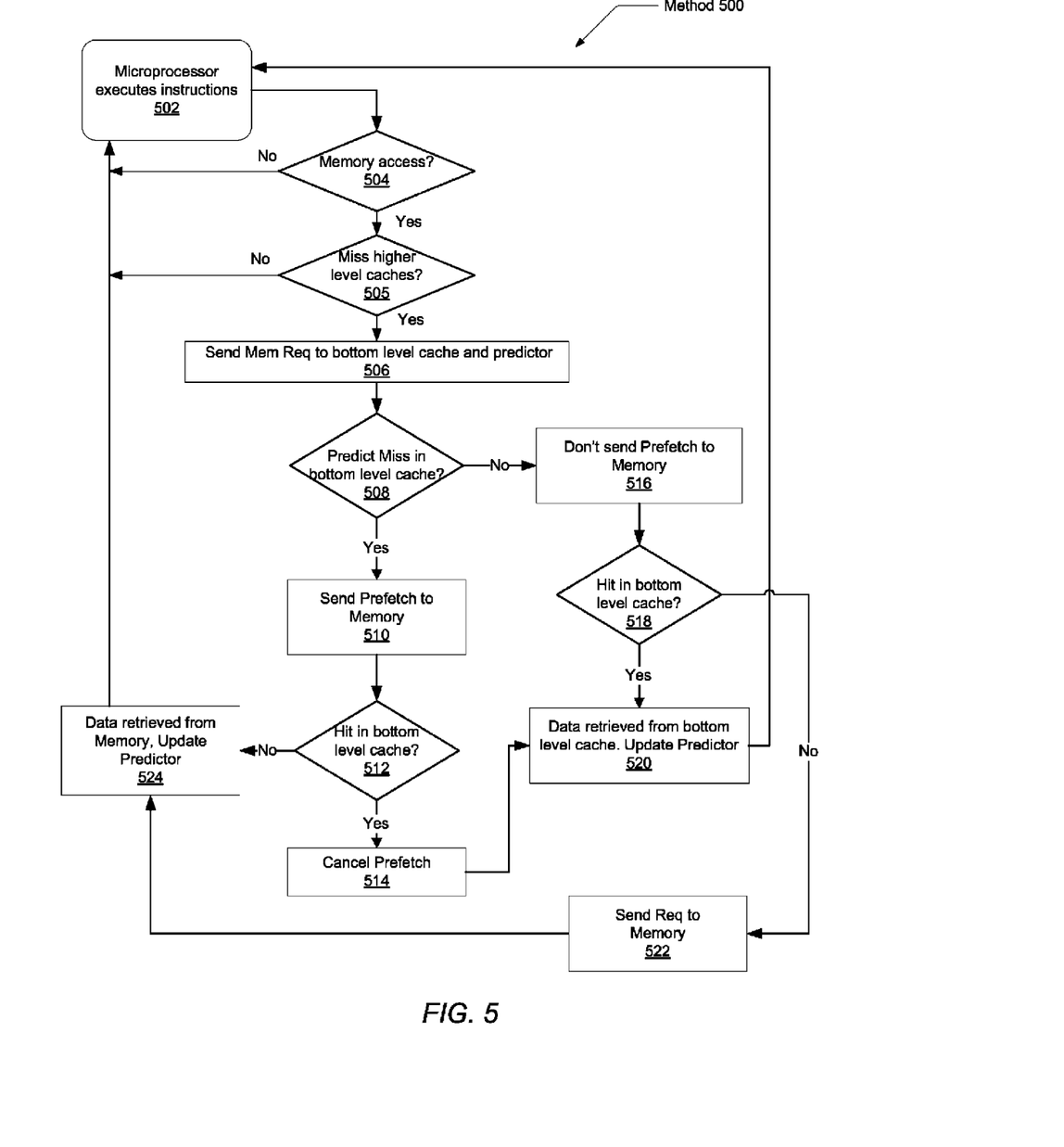
FIG. 5 is a flow diagram of one embodiment of a method for efficient speculative pre-fetching of data from system memory.

FIG. 5 illustrates one embodiment of a method for speculative pre-fetching of data from system memory. A processor executes instructions in block 502. Memory access instructions, such as load and store instructions, may be fetched and subsequently stored in queues for out-of-order execution. After an address is calculated for a memory access instruction, the instruction may be later chosen to be executed (decision block 504). At this time the processor core may send a memory request to the first level cache (and possibly other higher level caches). If the memory access misses in the higher level caches (decision block 505), the memory request is conveyed to lower levels of the cache hierarchy (e.g., the bottom level cache) and a cache hit predictor (block 506).

If the cache hit predictor predicts a miss in the bottom level cache (decision block 508), a pre-fetch request may be sent to the memory controller which may access memory, such as DRAM, to retrieve the requested memory line in block 510. During a pre-fetch request, if there is a hit in the bottom level cache (decision block 512), then the pre-fetch request may be cancelled in block 514. This action may prevent unnecessary use of system resources such as a network bus or exclusive ownership of a section of DRAM, such as a page. In block 520, the requested memory line may be retrieved from the bottom level cache that experienced a hit and the appropriate entries in the tables of the cache hit predictor are updated. For example, in one embodiment, if a hit occurred in the bottom level cache, then the appropriate counters are incremented. If a hit occurred in a cache prior to the bottom level cache, then in one embodiment, the counters may retain their present value, since the bottom level cache may not have been accessed. In another embodiment, the appropriate counters may be incremented in order to prevent future pre-fetch requests that may or may not be cancelled prior to access of system resources.

On the other hand, if there is no hit in the bottom level cache (decision block 512), then a request may be sent to the memory controller to retrieve the requested memory line, or data, from memory in block 524. The data may be retrieved from memory as usual. However, the data may be retrieved at an earlier time than usual due to the previously conveyed pre-fetch request (block 510). Thus, the latency to retrieve data may be reduced. The appropriate counters in the cache hit predictor may be decremented due to the correctly predicted miss in the bottom level cache.

If the cache hit predictor did not predict a miss in the bottom level cache (decision block 508), then no pre-fetch request is sent to the memory controller in block 516. If there is then a hit in the bottom level cache (decision block 518), then the actions of block 520 described above occur. However, if there is not a hit in the bottom level cache (decision block 518), then a memory request is sent to the memory controller in block 522 in order to retrieve the data from memory. The data may be retrieved from memory in block 524. The appropriate counters in the cache hit predictor may then be updated (e.g., decremented) in block 524.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
issuing memory access requests to a cache subsystem;
responsive to said issuing, allocating an entry in a prediction table and storing in the allocated entry information corresponding to a memory block in response to detecting a cache hit on a first memory line included in the memory block;
receiving a memory access request for a second memory line;
accessing the prediction table and predicting whether or not the second memory line is in the cache subsystem; and
simultaneously (i) issuing a pre-fetch request for the second memory line to a memory and (ii) conveying the request for the second memory line to the cache subsystem, in response to detecting said prediction is a miss prediction.

2. The method as recited in claim 1, further comprising cancelling said pre-fetch request in response to detecting said prediction is incorrect.

3. The method as recited in claim 2, further comprising providing a cache hit prediction if either a first predictor or a second predictor provides a cache hit prediction.

4. The method as recited in claim 1, wherein the cache subsystem comprises a multi-level cache subsystem, and wherein said predicting comprises predicting a hit or a miss only in a bottom level of the cache subsystem and not levels of the cache subsystem other than said bottom level.

5. The method as recited in claim 1, further comprising predicting a cache hit corresponding to an address portion of said second memory line when a particular counter corresponding to the address portion meets or exceeds a threshold value.

6. The method as recited in claim 5, further comprising:
incrementing the particular counter, in response to a cache hit corresponding to the address portion; and
decrementing the particular counter, in response to a cache miss corresponding to the address portion.

7. The method as recited in claim 1, further comprising:
storing a counter for each core of a plurality of cores in a multi-core processor; and
receiving a processor core identifier for a given core with the memory access request for the second memory line;
predicting a cache hit for the given core, in response to detecting a particular counter that corresponds to the core meets or exceeds a threshold value.

8. The method as recited in claim 7, further comprising:
incrementing the particular counter, in response to a cache hit for the given core; and
decrementing the particular counter, in response to a cache miss for the given core.

9. A computer system comprising:
a processor;
a cache subsystem coupled to the processor;
a cache hit predictor; and
a memory coupled to the processor;
wherein the cache hit predictor is configured to:
allocate an entry in a prediction table and store information in the allocated entry corresponding to a memory block in response to detecting a cache hit on a first memory line included in the memory block; and
detect a memory access request for a second memory line;
access the prediction table and predict whether or not the second memory line is in the cache subsystem;
wherein the processor is further configured to simultaneously (i) issue a pre-fetch request for the second memory line to the memory and (ii) convey the request for the second memory line to the cache subsystem, in response to detecting said prediction is a miss prediction.

10. The system as recited in claim 9, wherein the processor is further configure to cancel said pre-fetch request in response to detecting said prediction is incorrect.

11. The system as recited in claim 10, wherein the cache hit predictor comprises a 2-level predictor and is configured to provide a cache hit prediction if either of the 2 levels provides a cache hit prediction.

12. The system as recited in claim 10, wherein the processor is further configured to issue said pre-fetch request to the cache subsystem, and wherein predicting said prediction is incorrect comprises detecting said pre-fetch request hits in the cache subsystem.

13. The system as recited in claim 9, wherein the cache subsystem comprises a multi-level cache subsystem, and wherein said predicting comprises predicting a hit or a miss only in a bottom level of the cache subsystem and not levels of the cache subsystem other than said bottom level.

14. The system as recited in claim 9, wherein the cache hit predictor is further configured to predict a cache hit corresponding to an address portion of said second memory line when a particular counter corresponding to the address portion meets or exceeds a threshold value.

15. The system as recited in claim 14, wherein the cache hit predictor is further configured to:
    increment the particular counter, in response to a cache hit corresponding to the address portion; and
    decrement the particular counter, in response to a cache miss corresponding to the address portion.

16. The system as recited in claim 9, wherein the processor comprises a plurality of cores, and wherein the cache hit predictor is further configured to:
    store a counter for each core of the plurality of cores; and
    receive a processor core identifier for a given core with the memory access request for the second memory line;
    predict a cache hit for the given core, in response to detecting a particular counter that corresponds to the core meets or exceeds a threshold value.

17. The system as recited in claim 16, wherein the cache hit predictor is further configured to:
    increment the particular counter, in response to a cache hit for the given core; and
    decrement the saturating counter, in response to a cache miss for the given core.

18. A cache hit predictor comprising:
    a first table comprising a first plurality of entries, wherein an entry of the entries corresponding to a memory block is allocated in response to detecting a cache hit on a first memory line included in the memory block, and wherein allocated entry is configured to store information corresponding to the memory block;
    a second table comprising a second plurality of entries; and
    a selector coupled to the first table and the second table, wherein the selector is configured to:
        detect a memory access request for a second memory line;
        access the first table and/or the second table responsive to the request for the second memory line;
        provide a hit prediction for the second memory line, if either the first table or the second table provides a cache hit prediction;
        provide a miss prediction for the second memory line, if neither the first table nor the second table provides a cache hit prediction; and
        signal a pre-fetch request for the second memory line to memory, in response to detecting said prediction is a miss prediction.

19. The cache hit predictor as recited in claim 18, wherein an entry in the first table is further configured to predict a cache hit corresponding to an address portion of said second memory line when a counter corresponding to the address portion meets or exceeds a threshold value.

20. The cache hit predictor as recited in claim 18, wherein an entry in the second table is further configured to predict a cache hit corresponding to a received core number which identifies one of a plurality of cores of a multi-core processor, when a saturating counter corresponding to the core number meets or exceeds a threshold value.

* * * * *